US009124693B2

(12) United States Patent
Efrati et al.

(10) Patent No.: US 9,124,693 B2
(45) Date of Patent: Sep. 1, 2015

(54) METHOD AND SYSTEM FOR ON-HOLD MESSAGING FOR OFF NETWORK CALLS

(71) Applicant: Vonage Network, LLC, Holmdel, NJ (US)

(72) Inventors: Tzahi Efrati, Hoboken, NJ (US); Jaya Meghani, Old Bridge, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 14/019,873

(22) Filed: Sep. 6, 2013

(65) Prior Publication Data
US 2015/0071124 A1   Mar. 12, 2015

(51) Int. Cl.
| | |
|---|---|
| H04M 7/12 | (2006.01) |
| H04M 3/428 | (2006.01) |
| H04W 4/16 | (2009.01) |
| H04L 29/06 | (2006.01) |

(52) U.S. Cl.
CPC ......... H04M 3/4283 (2013.01); H04L 65/1096 (2013.01); H04M 3/4281 (2013.01); H04M 3/4285 (2013.01); H04M 7/12 (2013.01); H04W 4/16 (2013.01)

(58) Field of Classification Search
CPC  H04M 3/4288; H04M 3/4285; H04L 65/096; H04L 5/00; H04W 4/16
USPC ......... 379/215.01, 90.01; 370/259; 455/414.1
See application file for complete search history.

(56) References Cited

U.S. PATENT DOCUMENTS

| | | | |
|---|---|---|---|
| 2002/0136384 A1* | 9/2002 | McCormack et al. | ... 379/215.01 |
| 2005/0249192 A1* | 11/2005 | Schoeneberger et al. | ..... 370/352 |
| 2007/0165605 A1 | 7/2007 | Nguyen et al. | |
| 2009/0168978 A1* | 7/2009 | Laws et al. | ................. 379/93.17 |
| 2011/0164535 A1* | 7/2011 | Gillipalli et al. | .............. 370/259 |

FOREIGN PATENT DOCUMENTS

EP    2262291 A1    12/2010

OTHER PUBLICATIONS

International Searching Authority, International Search Report and Written Opinion for corresponding application PCT/US2014/054308, mailed Dec. 22, 2014, 11pgs.
Rosenberg, J., (Dynamicsoft) and Schulzrinne, H., (Columbia University), "An Offer/Answer Model with the Session Description Protocol (SDP)", The Internet Society, Jun. 2002, 25pgs.

(Continued)

Primary Examiner — Melur Ramakrishnaiah
(74) Attorney, Agent, or Firm — Duane Morris LLP; Joseph Pagnotta

(57) ABSTRACT

An Off Net scenario may occur during primary communications between a first and second caller, in which the second caller is connected to a network over a data channel and receives a second call over a voice channel resulting in an interruption of the primary communications between the original callers. In the Off Net scenario, a message indicating the original communication has been interrupted is received by a carrier. The carrier substitutes another communication device in place of the second caller's communication device to establish a secondary communication between the first caller's communication device and the third communication device. The secondary communication may inform the first caller of the interruption of the primary communication and may provide options regarding the primary communication to the first caller.

8 Claims, 6 Drawing Sheets

(56) References Cited

OTHER PUBLICATIONS

ETSI TS 123 083 V11.0.0 (Oct. 2012) Technical Specification, Global System for Mobile Communications (GSM), Digital Cellular Telecommunications System Phase Universal Mobile Telecommunications (UMTS); Call Waiting (CW) and Call Hold (CH) Supplementary Services; Stage 2 (3GPP TS 23.083 version 11.0.0 Release 11), Oct. 2012, 40pgs.

Rosenberg, J., et al., "SIP: Session Initiation Protocol", The Internet Society, Jun. 2002, 269pgs.

* cited by examiner

METHOD AND SYSTEM FOR ON-HOLD MESSAGING FOR OFF NETWORK CALLS

BACKGROUND

For many years, people have communicated over traditional landline phones on a PSTN connection and, more recently, over cellular telephones. Increasingly, smartphones are being used over cellular networks providing, among other things, the ability to communicate both voice and data, and allows users to perform a wide range of computing tasks through the availability of mobile "apps," which may be provided by third-party developers.

Smartphones provide for both increased computing features and data network access, and developers provide apps that allow voice communication over the data channel, i.e., voice-over-IP (VoIP). Because these apps use the data channel instead of the voice channel, certain savings may be realized.

However, the use of VoIP apps in place of the voice channel communication that is provided native to the smartphone introduces some challenges. One example is the ability to provide an on-hold message to the other caller. For calls where both callers are on the PSTN or cellular voice channel, if the first caller receives another call and wants to put the second caller on hold, a signal (such as one sent over the SS7 network) may be sent from the second caller's device to the first caller's device instructing it to play an on-hold indicator tone locally. Similarly, where both callers have the VoIP app, conveying on-hold status is readily done; the VoIP provider can provide a signaling message over the VoIP network conveying the on-hold status. However, this does not work if the second caller is communicating over a VoIP app on the data channel and the first caller is on PSTN or cellular voice channel. This is because the second caller's mobile carrier does not recognize that the second caller is even on a call (since it's not using the voice channel and did not otherwise set up a call on the voice channel); and the first caller's carrier may not be equipped to recognize a proprietary on-hold signal from the second caller's VoIP provider. Usually, the voice call over the voice channel will take priority over any other running applications on the second caller's phone, including the VoIP app, which will effectively, put the first caller on hold.

What is needed is a way to convey to the first caller (PSTN/cellular voice) that the call with the second caller has been put on hold. The VoIP user might not actively put the other person on hold. It can happen whenever the VoIP user receives an incoming voice call during a VoIP call. Usually, the voice call will take priority over any other running app, including the VoIP app, which will effectively, put the other side on hold.

In order to obviate the deficiencies in the art, the disclosed subject matter presents a novel method of providing secondary communication to a first communication device, wherein the first communication device is in primary communication with a second communication device via a network and the first communication device is in communication with the network over a voice channel and the second communication device is in communication with the network over a data channel. The method includes receiving a signaling message from the second communication device when the primary communication is interrupted and substituting the second communication device with a third communication device to establish a secondary communication between the first communication device and the third communication device.

The disclosed subject matter also presents a novel method for alerting the first caller that the second caller has placed the first call between the first caller and the second caller on hold. The method including determining an interruption, has occurred at the second caller's device of the first call; sending a message to a carrier and receiving the message at the carrier. In response to the message, the method includes disconnecting the second caller from the first call; connecting a third party to the first call in place of the second caller; and providing communications from the third party to the first caller.

These and many other objects and advantages of the present subject matter will be readily apparent to one skilled in the art to which the invention pertains from a perusal of the claims, the appended drawings, and the following detailed description of preferred embodiments.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using Internet protocol data communications.

In embodiments of the disclosed subject matter, Session Initiation Protocol (SIP) is used as the connection protocol to execute the call session set up (and subsequent tear down) steps. SIP is a signaling protocol for initiating, managing and terminating media (e.g., voice, data and video) sessions across packet based networks that typically use the Internet Protocol (IP) of which VoIP is an example. The details and functionality of SIP can be found in the Internet Engineering Task Force (IETF) Request for Comments (RFC) Paper No. 3261 entitled, "SIP: Session Initiation Protocol" herein incorporated in its entirety by reference.

Embodiments of the disclosed subject matter also describe the use of Session Description Protocol (SDP) in which participants to a media session offer each other a description of the desired session from the perspective. The details and functionality of SDP can be found in the IETF, RFC Paper No. 3264 entitled "An Offer/Answer Model with the Session Description Protocol (SDP)," which is also incorporated herein in its entirety by reference.

Figure 1:
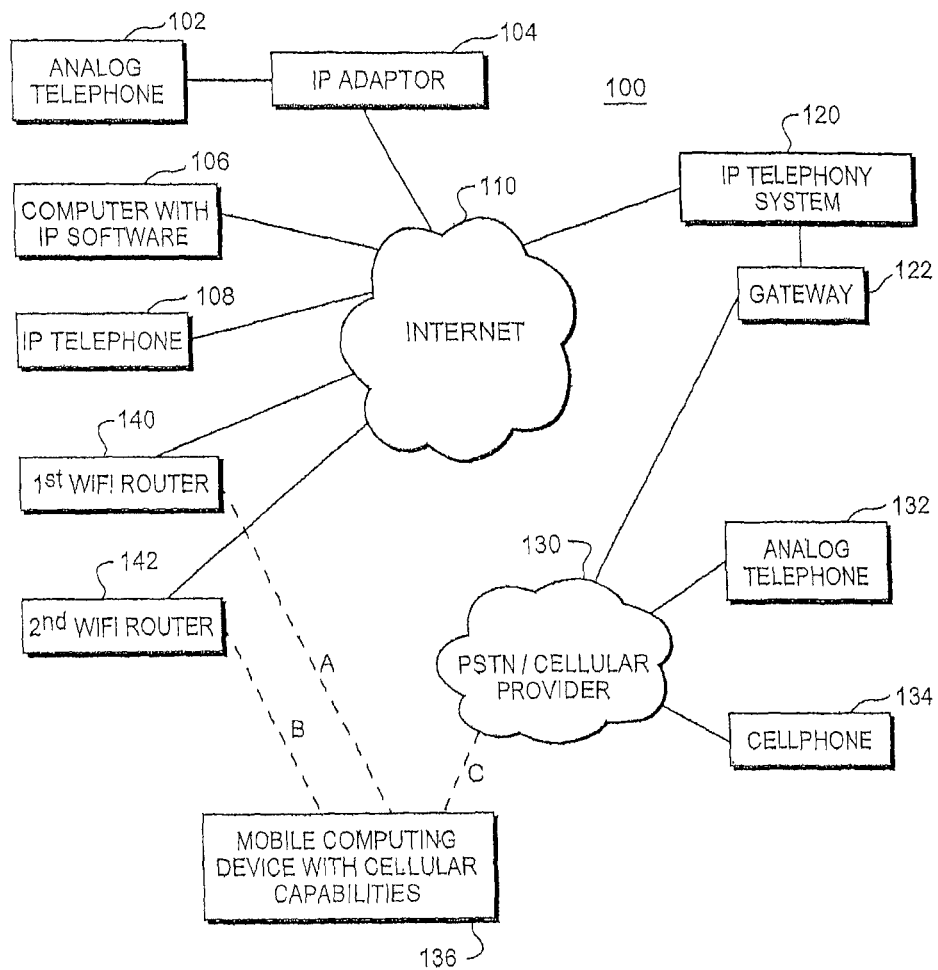
FIG. 1 is a diagram of a communications environment including various elements which are associated with an Internet protocol (IP) telephony system operating in accordance with the disclosed subject matter.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130 through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the Apple iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™. Such a device may act as a mobile telephony device once it is configured with appropriate application software.

FIG. 1 illustrates that a mobile computing device with cellular capabilities 136 is capable of establishing a first wireless data connection A, with a first wireless access point 140, such as a WiFI or WiMax router. The first wireless access point 140 is coupled to the Internet 110. Thus, the mobile computing device 136 can establish a VOIP telephone call with the IP telephony system 120 via a path through the Internet 110 and the first wireless access point 140.

FIG. 1 also illustrates that the mobile computing device 136 can establish a second wireless data connection B, with a second wireless access point 142 that is also coupled to the Internet 110. Further, the mobile computing device 136 can establish a third wireless data connection C, via a data channel provided by a cellular service provider 130 using its cellular telephone capabilities. The mobile computing device 136 could also establish a VOIP telephone call with the IP telephony system 120 via the second wireless connection B or the third wireless connection C.

Although not illustrated in FIG. 1, the mobile computing device 136 may be capable of establishing a wireless data connection to a data network, such as the Internet 110, via alternate means. For example, the mobile computing device 136 might link to some other type of wireless interface using an alternate communication protocol, such as the WiMax standard. Throughout the specification, the use of "communication device(s)" is intended to encompass mobile computing devices 136 as well as cellular and land line devices.

The current subject matter relates to situations where two callers—a first caller communicating over a traditional PSTN or cellular voice channel, and the second caller communicating through a VoIP application over a data channel, are on a call with each other, and the VoIP user receives a second call 208 over a voice channel. More specifically, the subject matter provides a mechanism to alert the first caller that the second caller has put him on hold.

Figure 2:
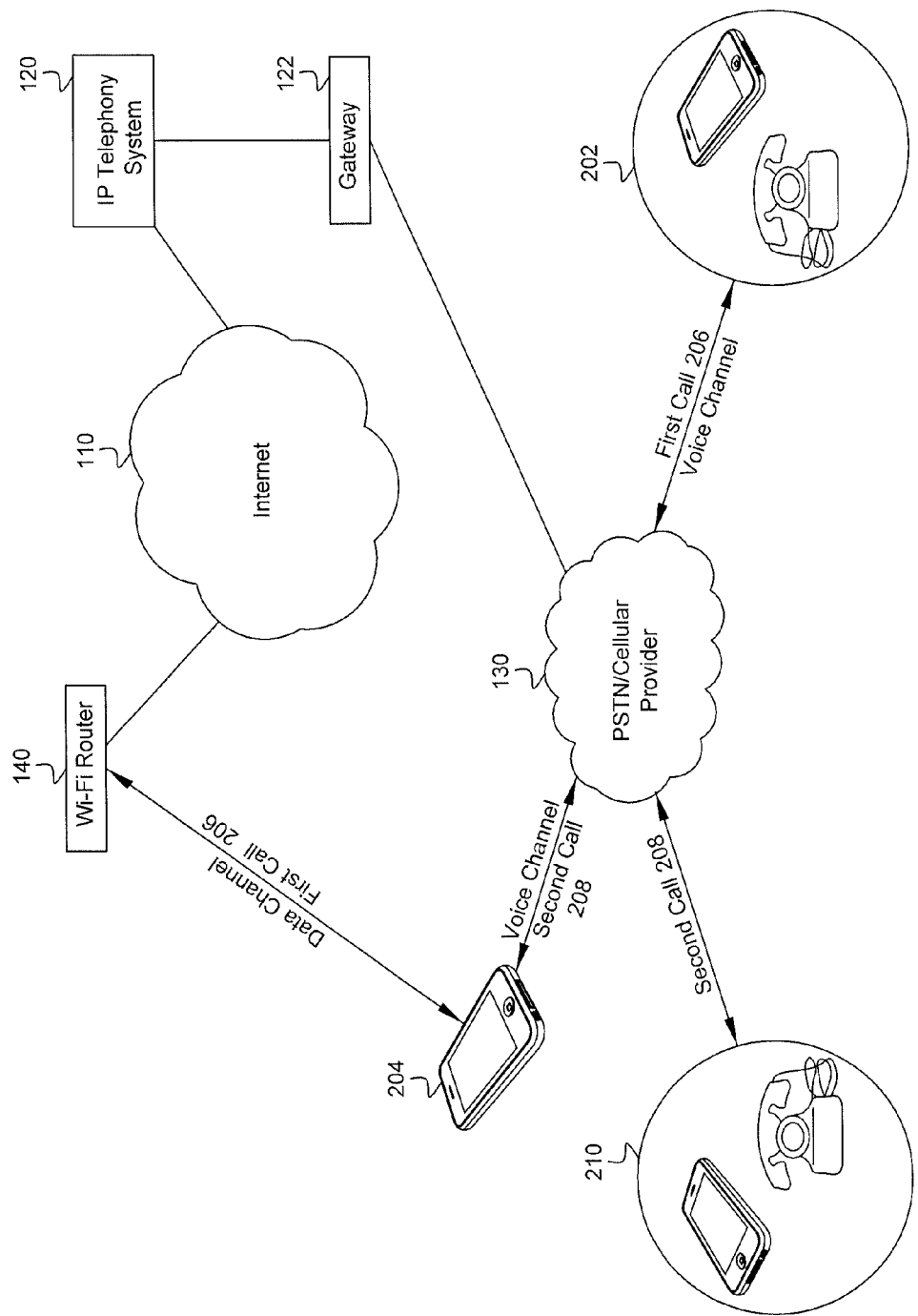
FIG. 2 is a simplified diagram of a telephony system utilizing an embodiment of the disclosed subject matter.

An exemplary scenario in which an embodiment of the disclosed subject matter is advantageously undertaken is shown in FIG. 2. A first user employing a first communication device 202, shown as either of a cellular phone or a traditional POTS phone is connected on a first call 206 with the second user employing a second communication device 204, shown as a mobile computing device.

The first communication device 202 is connected to the first call 206 over a voice channel of either a cellular provider or a Public Switch Telephone Network (PSTN 130). The PSTN/Cellular Provider 130 interfaces with the IP telephony system 120 via Gateway 122 as described in FIG. 1. The second communication device 204 connects to the first call 206 over a data channel through a Wi-Fi router 140 and the Internet 110, as described generally above. As shown in FIG. 2, during the first call 206, a second call 208 is initiated over the voice channel (typically a cellular channel) from a third caller 210. The initiation of the second call 208 during the first call 206 is an Off-Net scenario.

Figure 3:
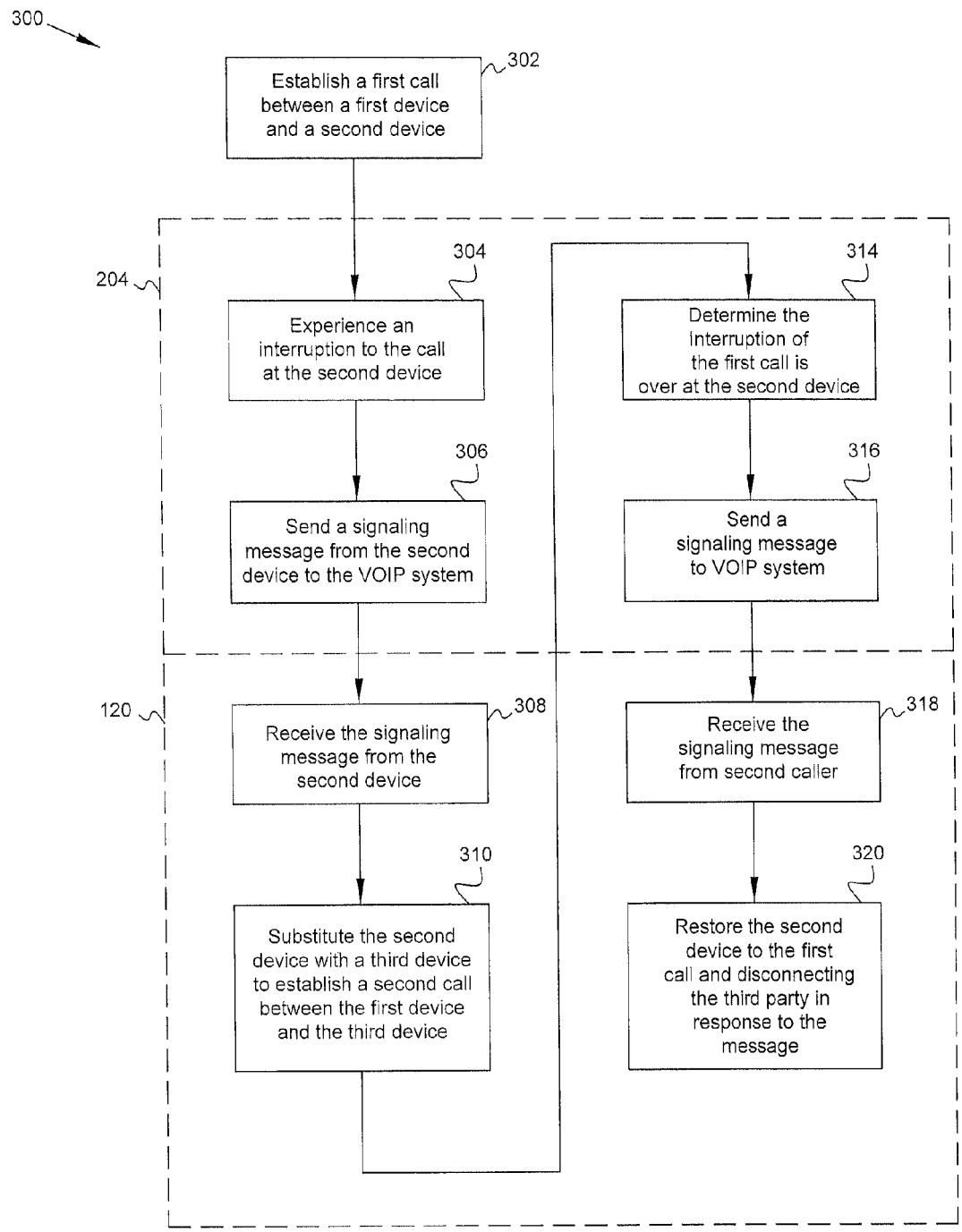
FIG. 3 is a flow chart for informing a call is placed on hold and then reestablished representing an embodiment of the disclosed subject matter.

FIG. 3 illustrates an embodiment of a disclosed method 300. A first call 206 (as described above) is established between the first device 202 and the second device 204 as shown in Block 302. When a second call 208 is initiated with the second communication device 204, the first call 206 is interrupted as shown in Block 304. In most mobile computing devices/smart phones today, a call coming over the voice channel will override all apps, including a VoIP app. The VoIP app will be notified by the operating system of the mobile computing device that it's been moved to the background (which occurs when the call comes in). The VoIP app may then check the telephone's state and the VoIP app recognizes that the second call 208 has come in and in response to the second call, the VoIP app sends a signaling message to the VoIP provider that the first call is now on hold as shown in Block 306. While FIG. 3 shows the step in Block 306 is performed by the second communication device 204, the VoIP provider may employ other means, such as detecting the lack of voice packets, to determine the first call 206 has been placed on hold by the second communication device 204.

The VoIP provider 120 receives the message from the second device as shown in Block 308 and substitutes the second device with a third device (such as device 624 in FIG. 6 and described in greater detail below) to establish a second call 208 between the first communication device and the third device as shown in Block 310. This substitution switches the media path so that media is now provided from the second caller's end from another source (the third device). The media provided between the third device and the first device is referred to as a secondary communication, and may include a prerecorded message, tone, an interactive menu (press #1 to leave a message, press #2 etc.), or two-way communication with an operator. The third device 624 may be many types of communications equipment that may serve as a source for the secondary communication.

When the interruption is over, the VoIP app recognizes that the call on the voice channel is over and the second caller is ready to re-engage with the first call 206 as shown in Block 314. If the second call 208 was over a data channel, a solution would be for the VoIP provider to switch back to the first call 206 when it receives a SIP BYE message [however as the second call 208 is over a voice channel, the second communication device 204 sends a message to the VoIP provider as shown in Block 316 to alert the VoIP provider the second call 208 has terminated. The VoIP app may use an API (for example, the API found at http://stackoverflow.com/questions/5028329/ios-4-2-return-to-app-after-phone-call/10635015#10635015 for iOS based devices) to tell the device to re-launch the app once a call has ended.

Upon receiving the message from the second communication device 204 as shown in Block 318, the VoIP provider 120 restores the connection to the second communication device 204 to the first call 206 and disconnects the third party (third device) as shown in Block 320.

Figure 4:
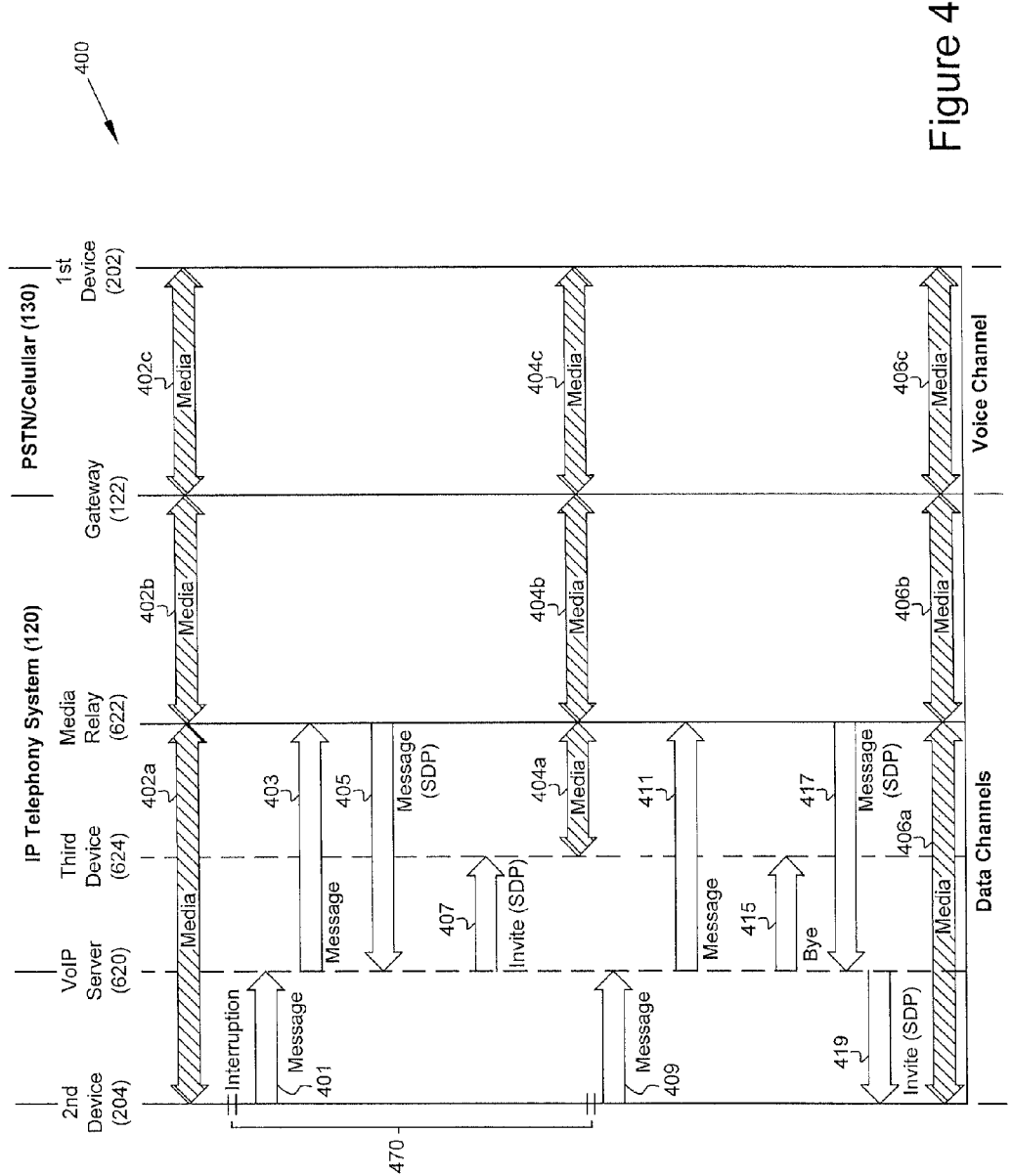
FIG. 4 is an illustration of a call flow diagram representing an embodiment of the disclosed subject matter.
Figure 5:
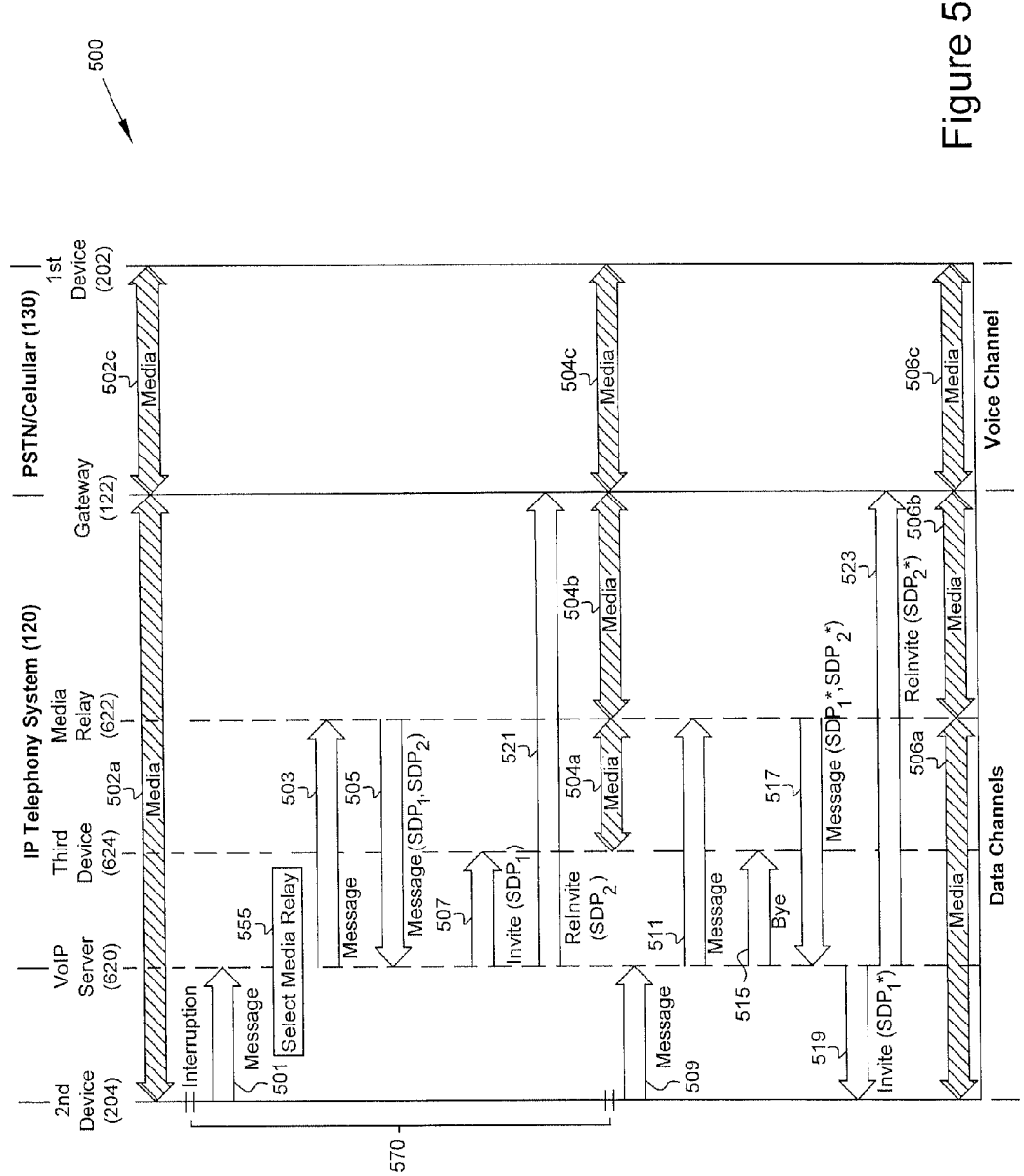
FIG. 5 is an illustration of a call flow diagram representing another embodiment of the disclosed subject matter.
Figure 6:
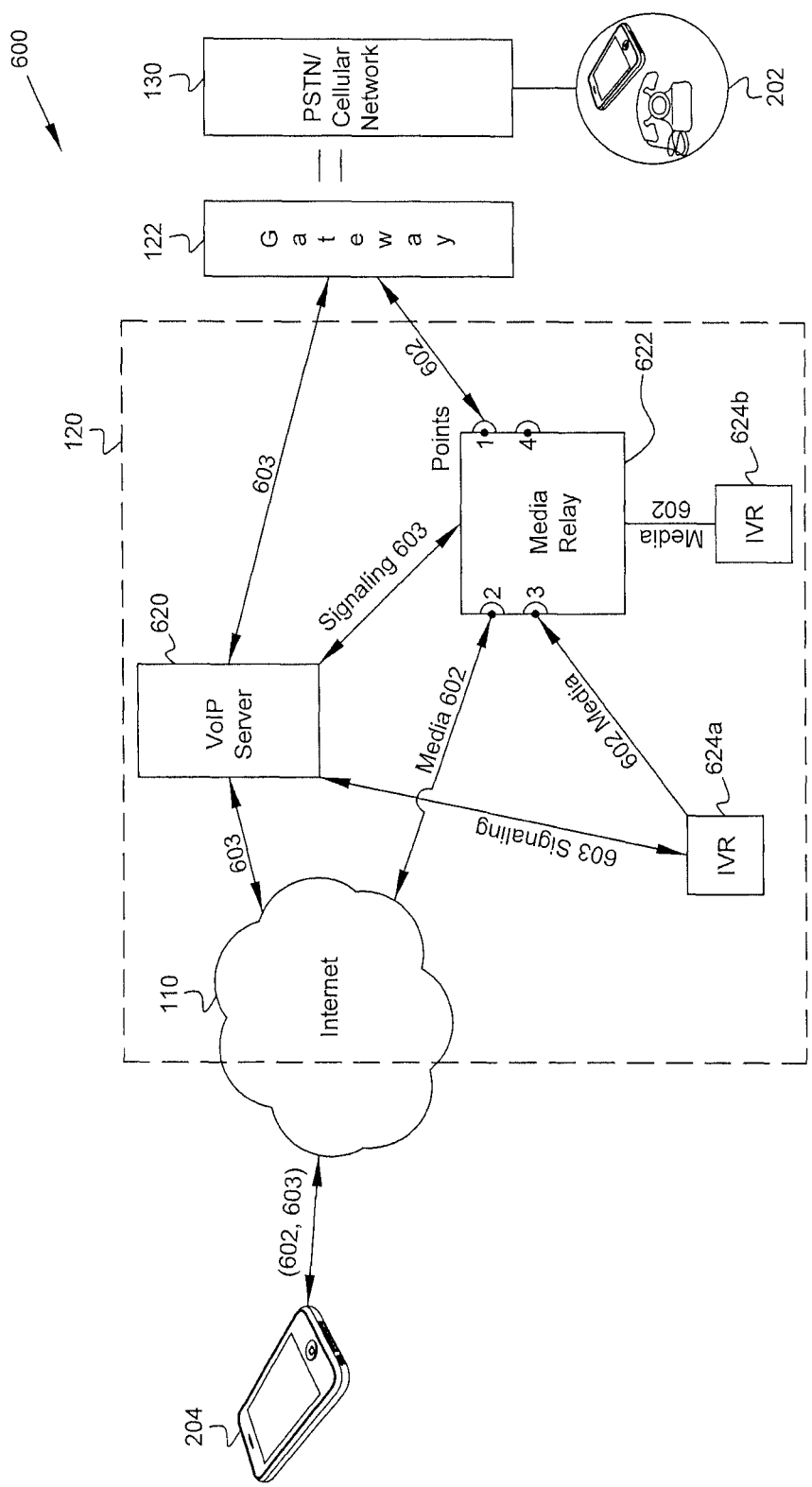
FIG. 6 is an exploded diagram of portions of the IP telephony system operating in accordance with an embodiment of the disclosed subject matter.

FIG. 4 is a high level call flow diagram 400 of an embodiment of the disclosed subject matter. During a first call 206 between the second device 204 and the first device 202, media (voice traffic) 402a, 402b and 402c is transmitted between the second device 204 and a Media relay 622 (see FIG. 6), the Media relay 622 and the Gateway 122, and the gateway 122 and the first device 202. The media is transmitted using Real Time Protocol (RTP) packets or other Voice over Packet (VOP) mechanism on media channels 602 as shown in a system overview 600 as shown in FIG. 6. For the purposes of FIGS. 4-6, media channels 602 and signaling channels 603 fall under data channels. When a second call 208 (interruption 470) over a voice channel comes into the second communication device 204, the VoIP app will send a SIP message or an API request to the VoIP server 620. Specifically, the VoIP app resident on the second communication device 204 generates a signaling message 401 to a VoIP server 620 which is part of the IP Telephony System 120 and may comprise proxies and other servers that manage VoIP sessions. If the first call 206 has already been going through a media relay 622 as shown on FIG. 6, then the VoIP provider can simply have the media relay 622 also handle the secondary communication with the first caller.

The VoIP server 620 generates a message 403 to the Media Relay 622 handling the first call media 402. The message 403 informs the Media Relay 622 that a change in media source is needed and requests an address for an open port in which to accept media from the new source, or addresses for an open pair of ports. The Media Relay 622 provides a response message 405 to the VoIP server 620. The response message includes a Session Description Protocol (SDP) which includes the address of the open port upon which the Media Relay 622 expects to receive media and possibly, list of accepted codecs, although not shown in FIG. 4, SDPs for a new set of inboard/outboard ports may also be provided, as shown in message 505 of FIG. 5. The port provided by the Media Relay 622 is internally connected to an outboard port that communicates Media 402b to the Gateway 122. In FIG. 6, for illustration only, the inboard ports (or second caller side ports) are labeled 2 and 3. and the outboard ports (or first caller side ports) are labeled 1 and 4.

Upon receipt of the message 405 from the media relay 622, the VoIP server 620 generates a message 407 to a third device 624, which includes the $SDP_1$ (in FIG. 4, the message 407 is shown as an INVITE message). The third device 624 may be a Voice Recorder or other type of audio source, for example an online music source, a message recording or playback system, an administrator proxy which can accept user instruction on how to handle the first call (terminate, leave message, call back etc.) or a terminal device associated with a live or simulated operator. In FIG. 6, two third devices 624a and 624b are shown. Third device 624a is separate from the Media Relay 622 and is accessed in the same manner as other VoIP endpoints, which is described in FIG. 4. Third device 624b however is associated with a dedicated port on the Media Relay 622 and alternatively may be integral with the Media Relay 622. The third device 624b may be connected directly with outboard port communication with only a message 403 from the VoIP server 620, in such case the message 403 would preferably include an indication to access the dedicated port and commence the secondary communication. The INVITE 407 includes the SDP provided by the Media Relay 622, and the third device 624 delivers Media 404a to the specified port on the Media Relay 622 which relays the media 404b to the Gateway 122 and onto the first device 202 as media 404c. Where the Media Relay 622 provides a new set of ports, a re-INVITE message to the Gateway 122 is also required, this re-INVITE message would be similar to the invite message 521 of FIG. 5.

The second communication device, determines the interruption 470 has concluded, then generates a Message 409 to the VoIP server 620 indicating the second caller is ready to resume the first call communication. The determination that the interruption 470 has concluded may be a function of a VoIP App, or a function handled by the network 120. In response, the VoIP server generates a Message 411 to the Media Relay 622 indicating a change in media source and requesting the address of a new port on which to receive the media 406a. The VoIP server 620 also generates a Bye message 415 to the third Device 624 which terminates the media connection to the Media Relay 622. The Media Relay 622 replies to the message 411 with message 417 including the SDP with the address of the desired port upon which to receive the Media 406a. The VoIP server 620 sends an invite message 419 including the SDP to the second communication device 204. The second communication device 204 sends and receives media 406a to and from the designated port on the Media Relay 622. The Media 406a is then relayed to and from the Gateway 122 as Media 406b and to and from the first communication device 202 as Media 406c.

FIG. 4, as discussed above, generally illustrates a scenario in which the outboard port of the Media Relay 622 in communication with the first device remains the same and only the inboard port is changed. FIG. 5, illustrates not only the method in which a media relay 622 must be selected, but also where both new inboard and outboard ports are provided by the Media relay 622 to the VoIP server 620 for the secondary communication and subsequently for the re-establishment of the primary communication.

If the first call 206 was a direct device to device call, (i.e. not involving a Media relay), the system will send a re-invite to the first caller to put the first communication device in contact with a selected media relay that can handle the secondary communication. FIG. 5 illustrates a high level call flow diagram 500 in which a media relay was not used to handle the first call.

During the first call 206 in the scenario shown in FIG. 5, between the second device 204 and the first device 202, media 502a and 502c is transmitted between the second device 204 and the Gateway 122, and the Gateway 122 and the first device 202. When a second call 208 (interruption 570) over a voice channel comes into the second communication device 204, the VoIP app resident on the second communication device 204 generates a signaling message 501 to a VoIP server 620. The VoIP server 620 then selects a Media Relay 622 to handle the communication as shown in Block 555 of FIG. 5. The selection of the Media Relay 622 may be based on load, proximity, quality of service ("QoS") and/or other characteristics. For example, the VoIP server 620 can select the closest Media relay between the two callers. That selection enables the ability to decrease latency and travel time of the Media 506.

The VoIP server 620 generates a message 503 to the selected Media Relay 622. The message 503 informs the Media Relay 622 that a media session needs to be established and requests addresses for open ports on the second callers side and the first callers side. The Media Relay 622 provides a response message 505 to the VoIP server 620. The response message includes a first $SDP_1$ and a second $SDP_2$ which include the addresses of the open ports upon which the Media Relay 622 expects to receive media and send media from, respectively. The ports provided by the Media Relay 622 are internally connected.

Upon receipt of the response message 505 from the Media Relay 622, the VoIP server 620 generates an Invite 507 to a third device 624 and a Re-Invite 521 to the Gateway 622. The Invite 507 includes the SDP1 provided by the Gateway 122 to receive media 504a and the third device 624 delivers Media 504a to the specified port on the Media Relay 622. The invite 521 includes the SDP2 provided by the Gateway 122 to receive and send media 504b from and to the Media Relay 622, which relays the media 504b to the first device 202 as media 504c.

The second communication device through the VoIP app upon determining the interruption 570 has concluded, generates a Message 509 to the VoIP server 620 indicating the second caller is ready to resume the first call communication. In response, the VoIP server generates a Message 511 to the Media Relay 622 indicating a change in media source and requesting the address of a new ports on which to receive the media 506a and 506b. The VoIP server 620 also generates a Bye message 515 to the third Device 624 which terminates the media connection to the Media Relay 622. The Media Relay 622 replies to the message 511 with message 517 including a new SDP1* and SDP2* which include the address of the desired ports upon which to receive and send the Media 506a and 506b (the * indicating the ports to be used to re-establish the primary communication as distinguished from the ports used to establish the secondary communication). The VoIP server 620 sends an invite message 519 including the SDP1* to the second communication device 204, and a re-invite message 523 to Gateway 122 including SDP2*. The second communication device 204 sends and receives media 506a to and from the designated port on the Media Relay 622. The Media 506a is then relayed to and from the Gateway 122 as Media 506b and to and from the first communication device 202 as Media 506c. The ports selected to receive the Media 504a from the third device 624 and the Media 506a from the second device 204, may be different or the same. If they are the same ports, the Bye message 515 must be sent and a response acknowledgement received prior to sending invite 519.

Other messages, such as authentication, acknowledgements and responses that are not necessary for the understanding of the disclosed subject matter are not shown in FIGS. 4 and 5, for example (ack, 200 Ok, trying, challenge, etc.)

While SIP messaging nomenclature is used in describing the VoIP signaling, other signaling, such as Sigtran, SS7, H.323, XMPP and ISDN are also envisioned.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method of providing secondary communication to a first communication device, wherein the first communication device is in primary communication with a second communication device via a network interface, and the first communication device connected to the network interface over a voice channel and the second communication device connected to the network interface over a data channel via VoIP, comprising:

receiving a signaling message from the second communication device indicative of a determined interruption to the primary communication, substituting the second device with a third communication device in response to the signaling message, to thereby establish the secondary communication between the first communication device and the third communication device; wherein the primary communication and the secondary communication is communication of media, wherein the step of substituting the second device with a third communication device further comprising:

sending a third signaling message to a media relay in response to the third signaling message, establishing communications between the media relay and the third communications device.

2. The method of claim 1, wherein the step of establishing communications between the media relay and the third communications device further comprises:

sending an invite to the third communications device, wherein the invite includes an address to a third port of the media relay, wherein the secondary communication from the third communications device are received at the third port of the media relay.

3. The method of claim 2, comprising; connecting the third port of the media relay with a first port of the media relay, wherein the first port is connected via the network interface with the first communication device.

4. The method of claim 3, wherein the third communication device is an audio messaging device.

5. A method of providing secondary communication to a first communication device, wherein the first communication device is in primary communication with a second communication device via a network interface, and the first communication device connected to the network interface over a voice channel and the second communication device connected to the network interface over a data channel via VoIP, comprising:

receiving a signaling message from the second communication device indicative of a determined interruption to the primary communication, substituting the second device with a third communication device in response to the signaling message, to thereby establish the secondary communication between the first communication device and the third communication device; wherein the primary communication and the secondary communication is communication of media, wherein the step of substituting the second device with a third communication device further comprising:

selecting a media relay;

sending a third signaling message to the media relay;

establishing communications between the media relay and the third communications device and establishing communications between the media relay and the first communication device via the network interface.

6. The method of claim 5, wherein the step of establishing communications between the media relay and the first communication device comprises:

substituting the second device with a third communication device further comprising:

sending an invite to the network interface, wherein the invite includes an address of a first port of the media relay.

7. The method of claim 6, wherein the step of establishing communications between the media relay and the third communications device further comprises:

sending a second invite to the third communications device, wherein the second invite includes an address to a third port of the media relay, wherein the secondary communication from the third communications device are received at the third port of the media relay.

8. The method of claim 7, comprising; connecting the third port of the media relay with the first port of the media relay, to establish the secondary communication between the third communication device and the first communication device via the network interface and media relay.

* * * * *